United States Patent
Voss

(10) Patent No.: US 6,529,533 B1
(45) Date of Patent: Mar. 4, 2003

(54) BEAM PARAMETER MONITORING UNIT FOR A MOLECULAR FLUORINE (F2) LASER

(75) Inventor: Frank Voss, Bad Ganders-heim (DE)

(73) Assignee: Lambda Physik AG, Goettingen (DE)

(*) Notice: Subject to any disclaimer, the term of this patent is extended or adjusted under 35 U.S.C. 154(b) by 141 days.

(21) Appl. No.: 09/712,877

(22) Filed: Nov. 14, 2000

Related U.S. Application Data

(60) Provisional application No. 60/166,952, filed on Nov. 22, 1999.

(51) Int. Cl.[7] .............................................. H01S 3/13
(52) U.S. Cl. ........................ 372/29.01; 372/57; 372/59; 372/9
(58) Field of Search .......................... 372/29.01, 57, 372/59, 98, 99, 103, 9

(56) References Cited

U.S. PATENT DOCUMENTS

| | | | |
|---|---|---|---|
| 4,616,908 A | 10/1986 | King | 350/576 |
| 5,051,558 A | 9/1991 | Sukhman | 219/121.68 |
| 5,221,823 A | 6/1993 | Usui | 219/121.78 |
| 5,440,587 A | 8/1995 | Ishikawa et al. | 375/332 |
| 5,450,436 A | 9/1995 | Mizoguchi et al. | 372/59 |
| 5,559,584 A | 9/1996 | Miyaji et al. | 355/73 |
| 5,590,146 A | 12/1996 | von Borstel | 372/58 |
| 5,763,855 A | 6/1998 | Shioji | 219/121.84 |
| 5,811,753 A | 9/1998 | Weick et al. | 219/121.78 |
| 6,219,368 B1 * | 4/2001 | Govorkov | 72/59 |
| 6,252,648 B1 | 6/2001 | Hase et al. | 355/53 |
| 6,327,290 B1 * | 12/2001 | Govorkov et al. | 372/61 |
| 6,442,182 B1 * | 8/2002 | Govorkov et al. | 372/29.021 |

FOREIGN PATENT DOCUMENTS

| | | | |
|---|---|---|---|
| EP | 0 790 681 A2 | 1/1997 | H01S/3/097 |
| JP | 408055792 A | 2/1996 | H01L/21/027 |
| WO | WO 98/57213 | 12/1998 | G02B/27/00 |
| WO | WO 98/59364 | 12/1998 | H01L/21/027 |
| WO | WO 99/04467 | 1/1999 | H01S/3/134 |
| WO | WO 99/08133 | 2/1999 | G03B/27/42 |
| WO | 1 017 086 A1 | 7/2000 | H01L/21/027 |

OTHER PUBLICATIONS

Rice et al., "Oscillator Performance and Energy Extraction from a KrF Laser Pumped by a High–Intensity Relativistic Electron Beam," *Journal of Quantum Electronics*, vol. QE–16, No. 12, Dec. 1980, pp. 1315–1326.

McKee, T., "Spectral–narrowing Techniques for Excimer Laser Oscillators," *CAN J. Phys.*, vol. 63, 1985, pp. 214–219.

(List continued on next page.)

Primary Examiner—Leon Scott, Jr.
(74) Attorney, Agent, or Firm—Sierra Patent Group, Ltd.; Andrew V. Smith

(57) ABSTRACT

A beam parameter monitoring unit is provided for use with a F2 laser system including means for filtering the red light from the VUV light of a beam portion split off from the mainbeam of the F2 laser before the beam portion reaches a detector. The filtering means includes a mirror that is highly reflective of VUV light ("VUV HR mirror"), particularly around 157 nm, and transparent to red light. The VUV HR mirror reflects the VUV light to a detector such that the properties and parameters of the main beam can be monitored, adjusted, controlled and/or stabilized. The VUV HR mirror is preferably surrounded by a shield for absorbing the red light transmitted through or around the VUV HR mirror. Also preferably, an aperture is provided that is just wide enough to permit the VUV radiation to substantially pass through, and to block the outer portions of the incident beam portion including substantially only red light. In addition, the beam parameter monitoring unit is enclosed in a sealed enclosure free of species that absorb VUV light such as oxygen, water vapor and hydrocarbons.

45 Claims, 4 Drawing Sheets

OTHER PUBLICATIONS

Ishchenko, V. N., et al., "High-power Efficient Vaccuum Ultraviolet F2 Laser Excited by an Electric Discharge," *Sov. J. Quantum Electron*, 16(5), May 1986, pp. 707–709.

S.M. Hooker et al., "Influence of Cavity Configuration on the Pulse Energy of a High–Pressure Molecular Fluorine Laser," *Applied Physics B Photo–Physics and Laser Chemistry*, vol. B55, No. 1., Jul. 1992, pp. 55–59.

J.A.R. Samson, "Techniques of Vacuum Ultraviolet Spectroscopy," John Wiley & Sons, New York.

H. Schomalenstroth et al., "Untersuchungen zum Laserstrahlschweissen mit 1–wk–nd:YAG–Laser unter Einsatz verschiedener Schutzgasgemische," *Schweissen Schneider*, 49 (1997) Heft 7, pp. 420–424.

* cited by examiner

US 6,529,533 B1

BEAM PARAMETER MONITORING UNIT FOR A MOLECULAR FLUORINE (F2) LASER

This application claims the benefit of priority to U.S. Provisional Patent Application No. 60/166,952, filed Nov. 22, 1999, and entitled Energy Monitor for a F2 Laser.

FIELD OF THE INVENTION

The invention relates to an F2 laser, and particularly to an apparatus for monitoring one or more parameters such as the output energy of a laser beam of the F2 laser.

BACKGROUND OF THE INVENTION

The present invention relates to the field of industrial molecular fluorine (F2) lasers and the application of F2 lasers in optical lithography, annealing, micro machining, photo-ablation and others. Excimer lasers currently used for these applications are mainly XeCl lasers (308 nm), KrF lasers (248 nm), and ArF lasers (193 mn).

In the future, F2 lasers (157 nm) will be more widely used based on their very short wavelength, particularly for such applications as sub-0.18 micron photolithography. This short wavelength, or high energy (157 nm=around 7.9 eV), photon emission is advantageous for photolithography applications because the critical dimension (CD), which represents the smallest resolvable feature size producible using photolithography, is proportional to the wavelength. This permits smaller and faster microprocessors and larger capacity DRAMs in a smaller package. The 7.9 eV photon is also readily absorbed in high band gap materials like quartz, synthetic quartz (SiO2), Teflon (PTFE), and silicone, among others, such that the F2-laser has great potential in a wide variety of material processing applications.

The construction and electrical excitation of the F2-laser differs from that of another type of gas discharge laser known as the excimer laser, referred to above. One difference is that the laser gas of an excimer laser includes a laser active constituent gas that has no bound ground state, or at most a weakly bound ground state. The laser active gas molecule of the excimer laser disassociates into its constituent atomic components upon optical transition from an upper to a lower state. In contrast, the laser active gas constituent molecule (F2) of the F2-laser responsible for the emission around 157 nm is bound and stable in the ground state. In this case, the F2 molecule does not disassociate after making its optical transition from the upper to the lower state.

The F2-laser has been known since around 1977 [see, e.g., Rice et al., VUV Emissions from Mixtures of F2 and the Noble Gases-A Molecular F2 laser at 1575 angstroms, Applied Physics Letters, Vol. 31, No. 1, Jul. 1, 1977]. However, previous F2 lasers have been known to exhibit relatively low gains and short gas lifetimes. Other parameters such as the pulse-to-pulse stability and laser tube lifetimes have been unsatisfactory. In addition, oxygen, water and other molecules exhibit high absorption cross sections around the desired 157 nm emission line of the F2-laser, further reducing overall efficiency at the wafer when encountered by the laser beam anywhere along its path. To prevent this absorption, one can maintain a purged or evacuated beam path for the F2-laser free or relatively free of oxygen and water (see U.S. patent application Ser. No. 09/343,333, assigned to the same assigned as the present application and hereby incorporated by reference). In short, despite the desirability of using short emission wavelengths for photolithography, F2-lasers have seen very little practical industrial application to date. Significant improvements are being made in the development of the F2 laser to achieve an F2-laser with enhanced gain, longer pulse lengths and pulse-to-pulse stability, and increased lifetime. Some of these improvements are described in the '333 application mentioned above, and others at U.S. patent applications Ser. Nos. 09/317,526, 09/317,527, 09/317,695, and 09/598,522, each of which is assigned to the same assignee and is hereby incorporated by reference into the present application.

For many industrial and laboratory applications, excimer and molecular fluorine (F2) lasers are used in an operating mode wherein active stabilization of the output power of the laser to a preset, configurable value of power or energy is important. The active stabilization of the output energy of these lasers typically involves an energy detector indirectly connected to a control component of the driving high voltage of the discharge in a feedback loop and to a gas control system and, accordingly, actively adjusting the driving voltage and controlling gas injections and/or gas replenishments to stabilize the energy. This is possible because, as the output energy or output power of the excimer or molecular fluorine laser is selected to be maintained in a certain range, it is known that this output energy value depends on the input high voltage and the precise gas mixture in the laser tube. Thus, a variation of output energy may be compensated by adjusting the high voltage and laser gas mixture. See U.S. patent applications Ser. Nos. 09/379,034, 09/418,052, 09/343/3333 and 09/594/892 (describing techniques for compensating output energy variation based on halogen depletion including gas replenishment, as well as high voltage adjustments over limited voltage ranges), each of which is assigned to the same assignee as the present invention and which is hereby incorporated by reference into the present application.

There are other parameters of the output beam of an excimer or molecular fluorine (F2) laser that it is desired to monitor for various reasons. Among these output beam parameters are beam profile, bandwidth, wavelength, energy stability, pulse shape and pulse duration. In particular, it is desired to monitor any of these parameters in order to provide a feedback mechanism for controlling them during operation of the laser, particularly when the output beam is being used for precise industrial processing applications such as photolithography of small structures.

The VUV laser radiation around 157 nm of the F2-molecule has been observed as being accompanied by further laser radiation output in the red region of the visible spectrum. This visible light originates from the excited fluorine atom (atomic transition). It is desired to have an F2-laser wherein the parameters of the VUV (157 nm) portion of the output beam, and particularly the energy, may be monitored without substantial interference due to the accompanying red emission spectrum of the laser.

SUMMARY OF THE INVENTION

It is therefore an object of the invention to provide a F2 laser having an energy or other beam parameter monitoring unit wherein the VUV portion of the beam may be monitored without substantial interference from the red portion of the overall F2 laser emission spectrum.

The present invention is a beam parameter monitoring unit for use with a molecular fluorine ($F_2$) laser that produces an output beam which includes ultra violet (UV) radiation and red radiation. The unit includes a mirror disposed to receive at least a portion of an output beam from the molecular fluorine laser, and a detector that measures at least one optical parameter of the output beam portion reflected by the mirror. The mirror substantially reflects ultra violet radiation in the output beam portion and substantially transmits red radiation in the output beam portion.

In another aspect of the present invention, a laser system includes a molecular fluorine ($F_2$) gain medium disposed in a resonant cavity, a power supply for exciting the gain medium to produce an output beam having an ultra violet (UV) radiation output at substantially 157 nm and a red radiation output in a 620 to 760 nm wavelength range, a mirror disposed to receive at least a portion of the output beam, and a detector for measuring at least one optical parameter of the output beam portion reflected by the mirror. The mirror substantially reflects the UV radiation output in the output beam portion and substantially transmits the red radiation in the output beam portion.

Other objects and features of the present invention will become apparent by a review of the specification, claims and appended FIGS.

DETAILED DESCRIPTION OF THE PREFERRED EMBODIMENTS

Figure 1A:
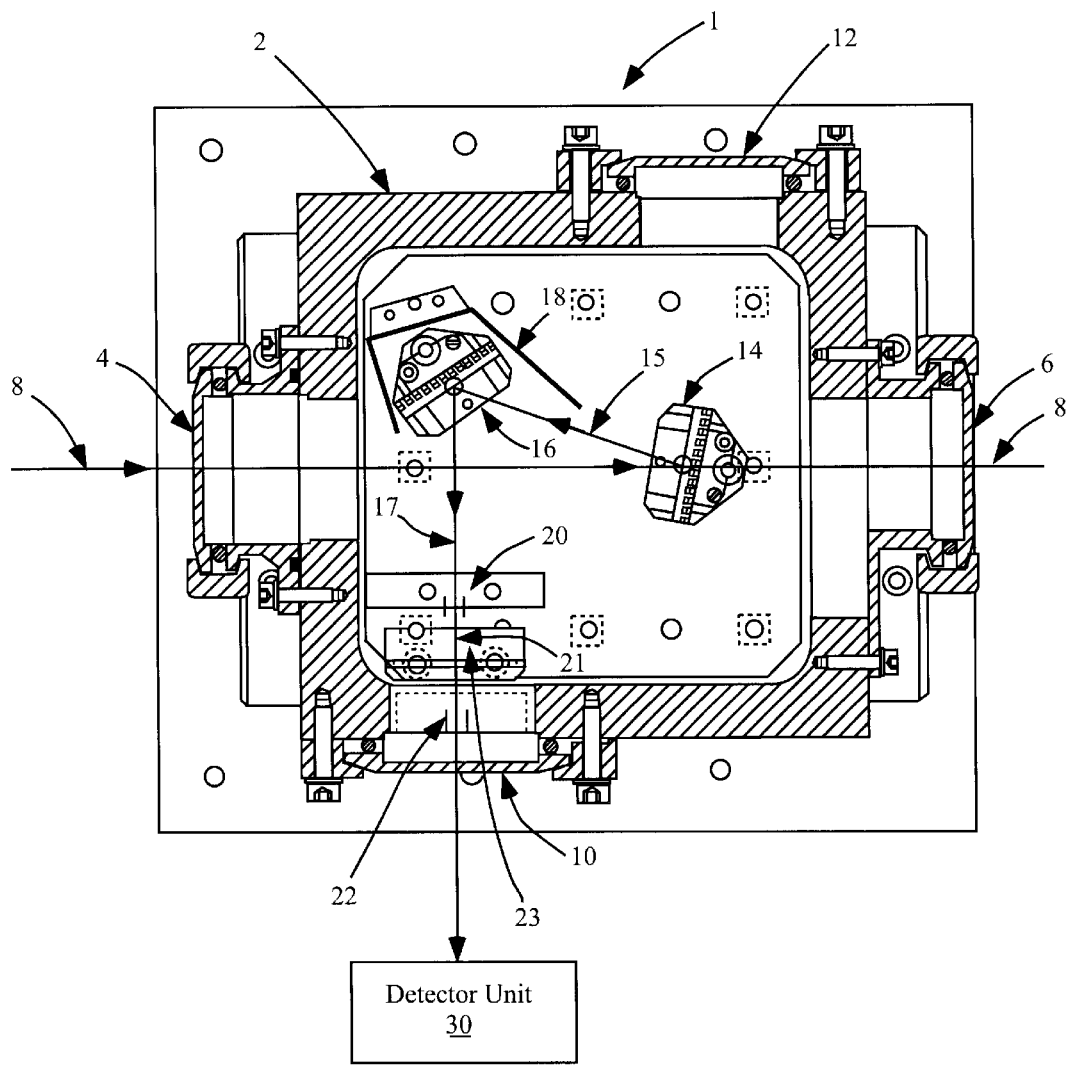
FIG. 1A shows a top view of a beam parameter monitoring unit in accord with a preferred embodiment of the present invention.

FIG. 1A shows a top view of a beam parameter monitoring unit 1 in accord with a preferred embodiment of the present invention. The monitoring unit 1 shown is housed in an enclosure 2. The enclosure 2 is sealed from the outer atmosphere and held at a high vacuum ($10^{-6}$–$10^{-4}$ mbar/l) to prevent diffusion of air and air pollution into the enclosure. The enclosure 2 is substantially free of species that absorb VUV radiation particularly around 157 nm. Such species include water vapor, oxygen and hydrocarbons.

To prepare the monitoring unit 1, the preferred procedure is as follows. The interior of the enclosure 2 may be first evacuated using a rotary mechanical or other conventional pumping device and purged with an inert gas such as nitrogen or argon or helium. The pumping and purging may be repeated several times. The procedure may be similar to that set forth in the '343 application referred to above. Alternatively, a higher volume pump may be used probably for a longer time to pump the interior down to a far better vacuum than in the preferred procedure. The high volume pumping may or may not be followed by back-filling with an inert gas. Preferably, evacuation and purging are accomplished using a re-sealable purge port 3 (see FIG. 2). The enclosure 2 may be sealably connected to one or more other such enclosures that are similarly used to protect the beam from absorption.

An entrance port 4 and an exit port 6 are provided so that a main beam 8 from an F2 laser system 241 may enter and exit the enclosure 2 preferably along a straight line path without requiring redirection by an additional mirror. One or more ports are also preferably provided for vacuum and/or inert gas purge connections for the procedure described above.

A detector port 10 is provided for outputting the beam portion to be monitored. The detector port 10 is configured so that a detector unit 30 may be positioned to receive the output beam portion to be monitored. The detector unit 30 may be equipped with an energy detector such as a photodiode or photomultiplier or pyroelectyric or quantum converter, or an array detector such as a CCD array, or a position sensitive diode (PSD), depending on the parameter to be monitored. An additional port 12 is shown and may be used, for example, if the entrance port 4 and exit port 6 are reversed, depending on the overall arrangement of the industrial system.

A beam splitter 14 is shown positioned in the optical path of the main beam 8. The beam splitter 14 is positioned to reflect a portion 15 of the main beam 8 at an angle to the main beam 8 toward the VUV HR mirror 16, described below. The beam splitter 14 comprises a material that substantially transmits VUV radiation particularly around 157 nm. The preferred material is calcium fluoride ($CaF_2$). Other materials such as magnesium fluoride ($MgF_2$), lithium fluoride (LiF), barium fluoride ($BaF_2$), strontium fluoride ($SrF_2$), and specially formed 157 nm quartz or sapphire are alternatives. A coating may be applied to the surface of the beam splitter 14 so that it just reflects a desired amount of the intensity of the main beam 8 and transmits the rest.

The VUV HR mirror 16 is positioned to receive the beam portion 15 reflected from the beam splitter 14. The VUV HR mirror 16 is positioned to reflect a portion 17 of the beam portion 15 reflected from the beam splitter 14 toward the detector port 10. As such, the reflective surface of the VUV HR mirror 16 is aligned at nearly a 45 degree angle to the main beam 8. The beam portion 17 is preferably reflected from the VUV HR mirror 16 nearly perpendicular to the main beam 8.

The VUV HR mirror 16 comprises a preferred material or materials, and possibly more than one layer of materials, that substantially reflects VUV light, while being substantially transparent to the red light in the beam portion. The material or materials preferably comprise $CaF_2$, $MgF_2$, quartz or sapphire. Advantageously, the beam portion 17 reflected from the VUV HR mirror 16 has a much higher intensity of VUV light relative the intensity of red light than the beam portion 15 incident at the VUV HR mirror 16. This allows the monitoring of the VUV portion of the output main beam 8 to be monitored with less interference from the red light in the beam 8.

A shield 18 is preferably positioned around the VUV HR mirror 16. The shield 18 comprises a material that absorbs red light (e.g., around 630 nm to 780 nm). The preferred material is copper, and alternatives include tantalum, Ni, gold, tungsten and dark ceramics (e.g. $Al_2O_3$, $Al_2O_2$). The shield 18 is configured large enough in extent to capture a substantial amount of the red light that transmitted through the VUV HR mirror 16. The shield 18 is configured, of course, so as not to block either the main beam 8 or the beam portion 15 reflected from the beam splitter 14 or the beam portion 17 reflected from the VUV HR mirror 16. Advantageously, the shield 18 prevents the red light that transmits through the VUV HR mirror 16 from reflecting off of other surfaces within the enclosure 2 and into the detector port 10, or through the entrance port 4 or the exit port 6, which would otherwise interfere with the monitoring of the beam parameters or other applications of the laser system.

Figure 1B:
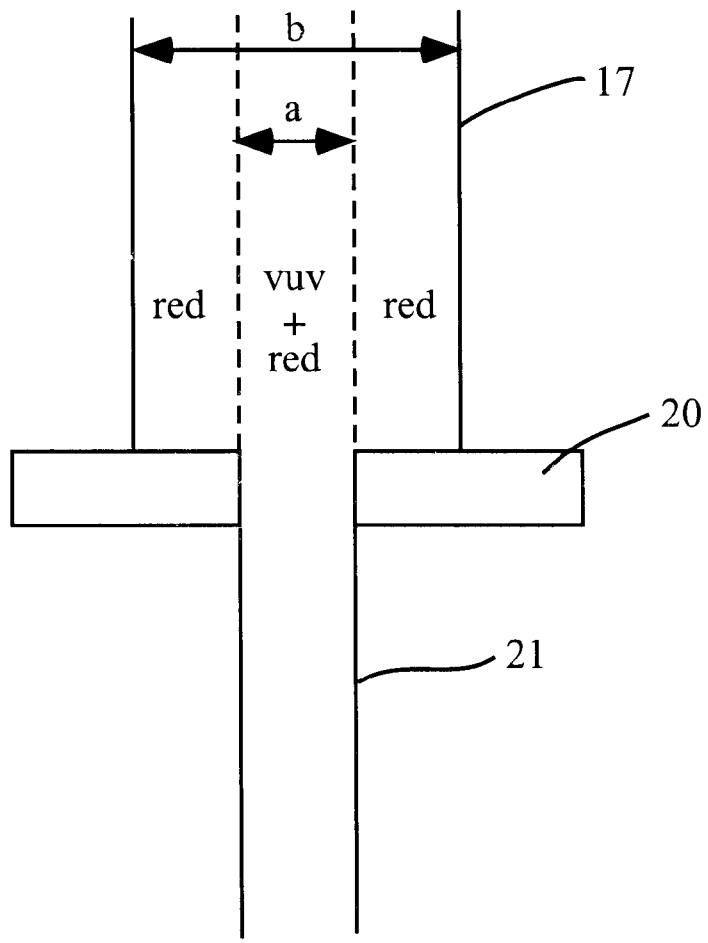
FIG. 1B illustrates the function of an aperture of the beam parameter monitoring unit in accord with the preferred embodiment of FIG. 1A.

The beam portion 17 reflected from the VUV HR mirror 16 is preferably first directed through an aperture 20, as schematically illustrated at FIG. 1A, before the beam portion 17 is introduced through the detector port 10. The aperture 20 may be a standard design, and may be such as is described at U.S. Pat. No. 4,993,042, assigned to the same assignee as the present application, and hereby incorporated by reference. FIG. 1B illustrates the function of the aperture 20 of the beam parameter monitoring unit 1 in accord with the preferred embodiment of FIG. 1A.

The beam portion 17 reflected from the VUV HR mirror 16 includes VUV light and some red light, although the red light intensity is diminished from that of the beam portion 15 reflected from the beam splitter 14 due to the wavelength dependent transmission properties of the VUV HR mirror 16 of FIG. 1A. The cross section of the beam portion 17 reflected from the VUV HR mirror 16 is illustrated before the aperture 20 in FIG. 1B and has an overall size/cross section of about dimension b. It has been discovered that the red light from the F2 laser 24 is more divergent than the VUV light. Thus, much of the red light within the beam portion 17 has a cross section having dimension b (and is outside of the cross section a), which is larger than the cross section dimension a of the VUV light.

The size of the aperture 20 is thus set to substantially just allow the VUV light beam to pass through, along with any red light that is contained within the dimension a of the VUV light beam. That is, the size of the aperture 20 is approximately equal to dimension a. The red light of the beam portion 17 that is outside of the inner diameter a between a and b is blocked by the aperture 20. The beam portion 21 passing through the aperture 20 thus has a cross section a and a higher proportion of VUV to red light intensity than beam portion 17. Advantageously, interference from the red light at the detector unit 30 is further diminished. The material of the aperture 20 is preferably the same as that of the shield 18, or one of the alternative shield materials mentioned above.

Referring back to FIG. 1A, the beam portion 21 passes through the aperture 20 and continues on to the detector port 10. The detector port 10 preferably has an attenuator or set of attenuators to set the intensity level of the UV-light ultimately striking the detector unit 30. Such attenuators as mesh filters, partially reflecting mirrors or optical flats may be used for this purpose. Also, U.S. patent application Ser. No. 09/172,805, which is assigned to the same assignee as the present application, is hereby incorporated by reference as teaching a detector having a coating for attenuating the beam striking the detector. The detector port 10 also preferably has an aperture 22 that is configured similarly to the aperture 20 as illustrated at FIG. 1B. That is, the size of the aperture 22 is set to substantially just allow the VUV portion of the beam portion 21 to pass through, and to block the outer portion of the beam portion 22 that comprises substantially red light. An attenuator set 23 (e.g. mesh filters) are used to reduce the amplitude of the beam incident upon the detector unit.

Figure 2:
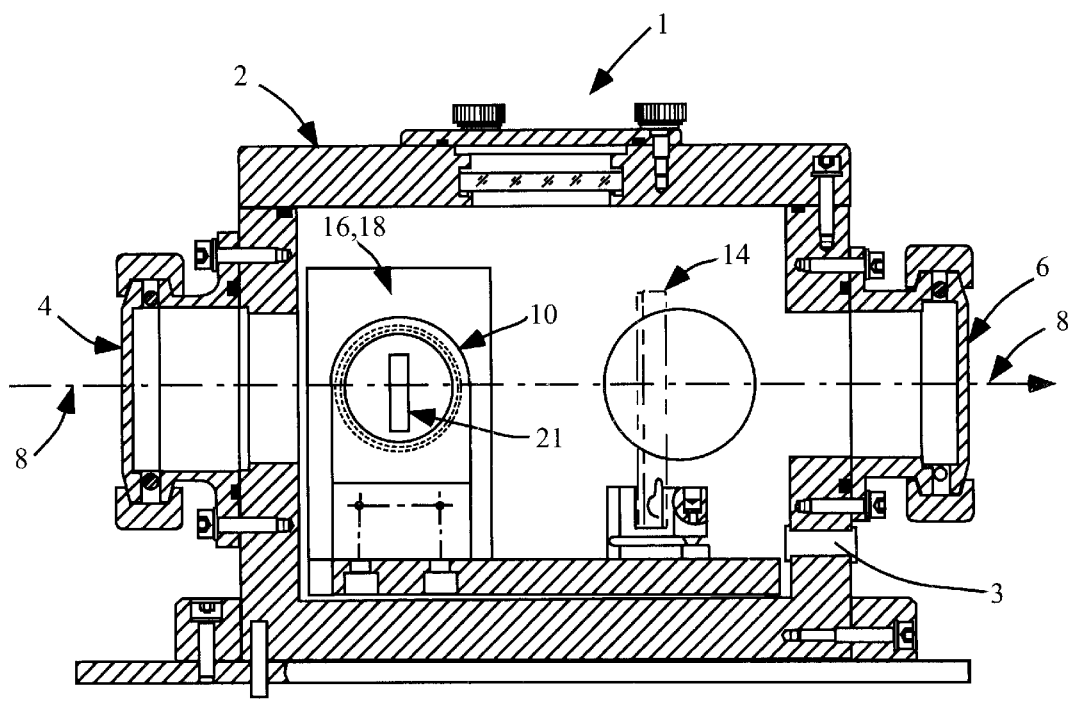
FIG. 2 shows a side view of the beam parameter monitoring unit of FIG. 1A.

FIG. 2 shows a side view of the beam parameter monitoring unit 1 of FIG. 1A. The main beam 8 is shown entering the monitoring unit 1 through the entrance port 4 and exiting via the exit port 6. The beam splitter 14 is shown in the beam path of the main beam 8 to reflect a beam portion 15 to the VUV HR mirror 16 surrounded by the shield 18, as shown and described in FIG. 1A. The beam portion 21 is shown exiting through the detector port 10 to be monitored by a detector.

Figure 3:
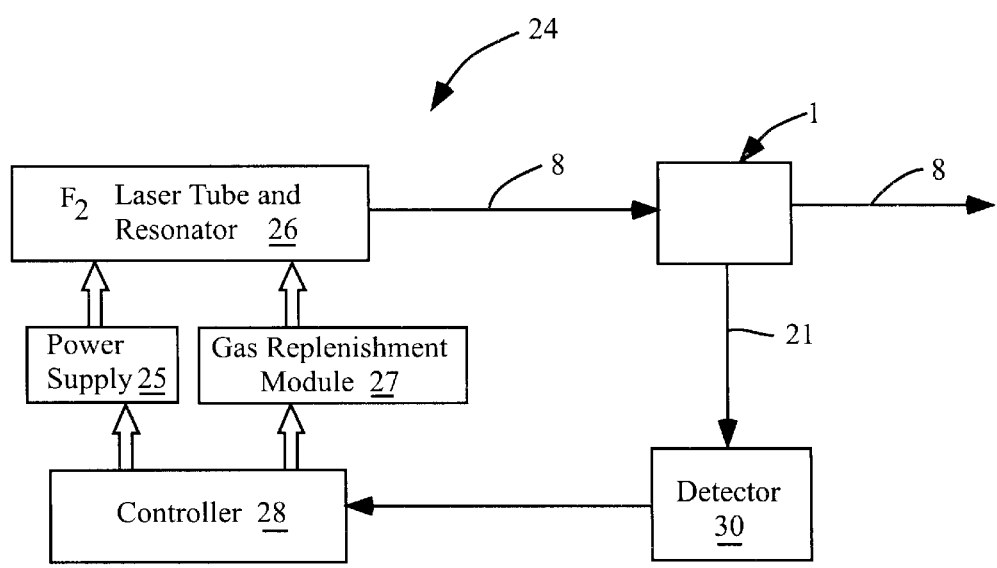
FIG. 3 is a plan view of the F2 laser system of the present invention.

The $F_2$ laser system 24 of the present invention is illustrated in FIG. 3, and includes a power supply 25 that excites a molecular fluorine gaseous gain medium within a laser tube and resonant cavity 26 to produce the main output beam 8. The monitoring unit 1 produces the beam portion 21 for the detector unit 30 with relatively little if any red radiation therein. A gas replenishment module 27, which is well known in the art, provides the desired pressure and mixture of gases in the laser tube through periodic gas injections and venting. A controller 28 is used to control the power supply 25 and the gas replenishment module 27 in response to data from the detector unit 30 relating to the parameter or parameters of the main beam being monitored. The controller 28 is used to adjust gas control or driving voltage adjustments, or even make wavelength or bandwidth adjustments, depending on the data received from detector unit 30.

Many variations of the preferred embodiment will be apparent to one skilled in the art. For example, a VUV HR mirror such as that described above with respect to the preferred embodiment may also be positioned in the path of the main beam of a F2 laser to filter red light from the main beam. As such, the main beam 8 would be reflected at an angle so that the entrance and exit ports would be positioned differently than shown in FIG. 1A.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above.

What is claimed is:

1. A beam parameter monitoring unit for use with a molecular fluorine (F2) laser that produces an output beam which includes ultra violet (UV) radiation resulting from de-excitations of fluorine molecules in its gain medium, and red radiation resulting from de-excitations of fluorine atoms in its gain medium, the unit comprising:

a mirror disposed to receive at least a portion of an output beam from the molecular fluorine laser, wherein the mirror substantially reflects ultra violet radiation from said de-excitations of said fluorine molecules in the output beam portion and substantially transmits red radiation from said de-excitations of said fluorine atoms in the output beam portion;

a detector for measuring at least one optical parameter of the output beam portion reflected by the mirror, said at least one parameter being selected from the group consisting of energy, energy stability, bandwidth, wavelength, beam profile, pulse shape, pulse duration, output power, pulse length and pulse to pulse stability, whereby said at least one optical parameter is measured by the detector without substantial interference by the red radiation that is transmitted by the mirror and not substantially reflected along with the ultraviolet radiation that is reflected by the mirror to the detector; and wherein the detector is signal coupled with a controller and sends signals to the controller indicative of measured values of said at least one parameter for said controller to then send control signals to at least one of a gas replenishment module, a power supply of said laser, a wavelength control component of a bandwidth feedback mechanism and a bandwidth control component of a wavelength feedback mechanism.

2. The beam parameter monitoring unit of claim 1, further comprising:

a shield disposed adjacent the mirror for capturing the red radiation transmitted by the mirror.

3. The beam parameter monitoring unit of claim 1, further comprising:
   a first aperture for blocking an outer cross-section portion of the output beam portion while passing an inner cross-section center portion of the output beam portion on to the detector.

4. The beam parameter monitoring unit of claim 3, further comprising:
   a beam splitter disposed in the output beam to deflect the portion of the output beam toward the mirror.

5. The beam parameter monitoring unit of claim 4, further comprising:
   a sealed enclosure in which the mirror, the first aperture, the beam splitter and the shield are disposed.

6. The beam parameter monitoring unit of claim 5, wherein the enclosure further comprises:
   an entrance port through which the output beam enters the enclosure;
   an exit port through which the output beam exits the enclosure; and
   a detector port through which the output beam portion reflected by the mirror exits the enclosure.

7. The beam parameter monitoring unit of claim 6, wherein the detector port includes a second aperture for blocking an outer cross-section portion of the output beam portion from the first aperture and for allowing an inner cross-section center portion of the output beam portion from the first aperture to pass through the detector port.

8. The beam parameter monitoring unit of claim 5, wherein the at least one optical parameter includes one of energy, energy stability, bandwidth, wavelength, beam profile, pulse shape and pulse duration.

9. The beam parameter monitoring unit of claim 5, wherein the enclosure further includes:
   a purge port for receiving a gas that prevents absorption of the UV radiation in the output beam and output beam portion by expelling photo-absorbing species such as water vapor, oxygen and hydrocarbons from the enclosure.

10. An optical module as in claim 1, further comprising:
    a sealed enclosure in which the mirror is disposed;
    an entrance port through which the output beam enters the enclosure; and
    at least one port for preparing an atmosphere within the enclosure to prevent disturbance of the beam by expelling gaseous species from the enclosure, and
    wherein the detector is coupled to the enclosure such that the reflected radiation propagates along a beam path through said prepared atmosphere.

11. A laser system comprising:
    a molecular fluorine (F2) gain medium disposed in a resonant cavity;
    a power supply for exciting the gain medium to produce an output beam having an ultra violet (UV) radiation output at substantially 157 nm resulting from de-excitations of fluorine molecules in the gain medium and a red radiation output in a 620 to 760 nm wavelength range resulting from de-excitations of fluorine atoms in its gain medium;
    a mirror disposed to receive at least a portion of the output beam
    wherein the mirror substantially reflects the UV radiation output from said de-excitations of said fluorine molecules in the output beam portion and substantially transmits the red radiation from said de-excitations of said fluorine atoms in the output beam portion; and
    a detector for measuring at least one optical parameter of the output beam portion reflected by the mirror, said at least one parameter being selected from the group consisting of energy, energy stability, bandwidth, wavelength, beam profile, pulse shape, pulse duration, output power, pulse length and pulse to pulse stability, whereby said at least one optical parameter is measured by the detector without substantial interference by the red radiation that is transmitted by the mirror and not substantially reflected along with the ultraviolet radiation that is reflected by the mirror to the detector; and
    a gas replenishment module, and
    wherein the detector is signal coupled with a controller and sends signals to the controller indicative of measured values of said at least one parameter for said controller to then send control signals to at least one of the gas replenishment module, the power supply of said laser, a wavelength control component of a bandwidth feedback mechanism and a bandwidth control component of a wavelength feedback mechanism.

12. The laser system of claim 11, further comprising:
    a shield disposed adjacent the mirror for capturing the red radiation transmitted by the mirror.

13. The laser system of claim 11, wherein the output beam portion reflected by the mirror includes an outer cross-section portion containing substantially red radiation and an inner cross-section center portion containing substantially ultra violet radiation, the unit further comprising:
    a first aperture for blocking the outer cross-section portion while passing the inner cross-section center portion on to the detector.

14. The laser system of claim 13, further comprising:
    a beam splitter disposed in the output beam to deflect the portion of the output beam toward the mirror.

15. The laser system of claim 14, further comprising:
    a sealed enclosure in which the mirror, the first aperture, the beam splitter and the shield are disposed.

16. The laser system of claim 15, wherein the enclosure further comprises:
    an entrance port through which the output beam enters the enclosure;
    an exit port through which the output beam exits the enclosure; and
    a detector port through which the output beam portion reflected by the mirror exits the enclosure.

17. The laser system of claim 16, wherein the detector port includes a second aperture for blocking an outer cross-section portion of the output beam portion from the first aperture, and for allowing an inner cross-section center portion of the output beam portion from the first aperture to pass through the detector port.

18. The laser system of claim 15, wherein the at least one optical parameter includes one of energy, energy stability, bandwidth, wavelength, beam profile, pulse shape and pulse duration.

19. The laser system of claim 15, wherein the enclosure further includes:
    a purge port for receiving a gas that prevents absorption of the UV radiation in the output beam and output beam portion by expelling photo-absorbing species such as water vapor, oxygen and hydrocarbons from the enclosure.

20. The laser system of claim 15, further comprising:
a controller for controlling the power supply, wherein the controller modifies the excitation of the gain medium by the power supply in response to the at least one optical parameter measured by the detector.

21. The laser system of claim 20, further comprising:
a laser tube for containing the gain medium, wherein the gain medium is gaseous; and
a gas replenishment module controlled by the controller and connected to the laser tube for adding and withdrawing gas to the gain medium;
wherein the controller modifies the gas added to and withdrawn from the gain medium in the laser tube by the gas replenishment module in response to the at least one optical parameter measured by the detector.

22. An excimer or molecular fluorine laser system as in claim 11, further comprising;
a sealed enclosure in which the mirror is disposed;
an entrance port through which the output beam enters the enclosure; and
at least one port for preparing an atmosphere within the enclosure to prevent disturbance of the beam by expelling gaseous species from the enclosure, and
wherein the detector is coupled to the enclosure such that the reflected radiation propagates along a beam path through said prepared atmosphere.

23. A laser system comprising;
a molecular fluorine (F2) gain medium disposed in a resonant cavity;
a power supply for exciting the gain medium to produce an output beam having an ultra violet (UV) radiation output resulting from de-excitations of fluorine molecules in the gain medium at substantially 157 nm, and red radiation output resulting from de-excitations of fluorine atoms in the gain medium;
a mirror disposed to receive the output beam, wherein the mirror substantially reflects a first beam portion of the output beam and substantially transmits a second beam portion of the output beam;
a detector for measuring at least one optical parameter of the output beam by detecting one of the first beam portion and the second beam portion reflected from and transmitted through, respectively, the mirror; and
a plate formed of a material which exhibits substantial absorptivity of visible light, said plate having an aperture defined therein for allowing a first portion of said one of said first and second beam portions to transmit said aperture while blocking a second portion of said one of said first and second beam portions, said second portion containing a substantially greater proportion of visible radiation from said de-excitations of said fluorine atoms than said transmitted portion, whereby said at least one optical parameter, selected from the group of optical parameters consisting of energy, energy stability, bandwidth, wavelength, beam profile, pulse shape, pulse duration, output power, pulse length and pulse to pulse stability, of said transmitted portion is measured by the detector and said blocked portion is not detected at said detector, such that said transmitted portion is detected without substantial interference from the visible radiation of said blocked portion,
a gas replenishment module; and
a controller, wherein the detector is signal coupled with the controller and sends signals to the controller indicative of measured values of said at least one parameter for said controller to then send control signals to at least one of the gas replenishment module, the power supply of said laser, a wavelength control component of a bandwidth feedback mechanism and a bandwidth control component of a wavelength feedback mechanism.

24. The laser system of claim 23, wherein said plate is formed of a material selected from the group of materials consisting of copper, tantalum, nickel, gold, tungsten and dark ceramics.

25. The laser system of claim 23, wherein said plate is formed of copper.

26. The laser system of claim 23, further comprising a sealed enclosure in which the mirror and at least a portion of a beam path between the mirror and the detector are disposed, said plate being disposed along the beam path between the mirror and the detector.

27. The laser system of claim 26, wherein the enclosure further comprises:
an entrance port through which the output beam enters the enclosure;
a detector port through which said one of said first and second beam portions exits the enclosure to be incident at said detector; and
an exit port through which the other of said first and second beam portions exits said enclosure.

28. The laser system of claim 27, wherein the at least one optical parameter includes one of energy, energy stability, bandwidth, wavelength, beam profile, pulse shape and pulse duration.

29. The laser system of claim 27, wherein the at least one optical parameter includes wavelength.

30. The laser system of claim 29, further comprising a controller for controlling the wavelength emitted by the laser system, wherein the controller modifies a condition of the laser system to effect a change in wavelength in response to the wavelength measured by the detector.

31. The laser system of claim 27, wherein the enclosure further includes at least one gas flow port for expelling photo-absorbing species such as water vapor, oxygen and hydrocarbons from the enclosure.

32. The laser system of claim 23, further comprising:
a laser tube for containing the gain medium, wherein the gain medium is gaseous; and
a gas replenishment module controlled by the controller and connected to the laser tube for adding gas to and withdrawing gas from the gain medium;
wherein the controller modifies the gas added to and withdrawn from the gain medium in the laser tube by the gas replenishment module in response to the at least one optical parameter measured by the detector.

33. A laser system comprising:
a molecular fluorine (F2) gain medium disposed in a resonant cavity;
a power supply for exciting the gain medium to produce an output beam having an ultra violet (UV) radiation output resulting from de-excitations of fluorine molecules in the gain medium at substantially 157 nm, and red radiation output resulting from de-excitations of fluorine atoms in the gain medium;
a mirror disposed to receive the output beam, wherein the mirror substantially reflects a first beam portion of the output beam and substantially transmits a second beam portion of the output beam;
a detector for measuring at least one optical parameter selected from the group of optical parameters consisting of energy, energy stability, bandwidth, wavelength, beam profile, pulse shape, pulse duration, output power, pulse length and pulse to pulse stability of the UV radiation output of the output beam by detecting one of the first beam portion and the second beam portion reflected from and transmitted through, respectively, the mirror;

a visible radiation filter for filtering visible radiation from said de-excitations of said fluorine atoms from said one of said first and second beam portions before being detected at said detector, whereby said at least one optical parameter of the UV radiation output from said de-excitations of said fluorine molecules is measured by the detector without substantial interference by the visible radiation from said de-excitations of said fluorine atoms;

a sealed enclosure in which the mirror and at least a portion of a beam path between the mirror and the detector are disposed, said enclosure having its interior atmosphere prepared to be substantially free of species that photoabsorb around 157 nm;

a gas replenishment module; and a controller, wherein the detector is signal coupled with the controller and sends signals to the controller indicative of measured values of said at least one parameter for said controller to then send control signals to at least one of the gas replenishment module, the power supply of said laser, a wavelength control component of a bandwidth feedback mechanism and a bandwidth control component of a wavelength feedback mechanism.

34. The laser system of claim 33, wherein said species include water vapor, oxygen and hydrocarbons.

35. The laser system of claim 33, wherein the enclosure further comprises:

an entrance port through which the output beam enters the enclosure;

a detector port through which said one of said first and second beam portions exits the enclosure to be incident at said detector; and an exit port through which the other of said first and second beam portions exits said enclosure.

36. The laser system of claim 35, wherein the at least one optical parameter includes one of energy, energy stability, bandwidth, wavelength, beam profile, pulse shape and pulse duration.

37. The laser system of claim 35, wherein the at least one optical parameter includes wavelength.

38. The laser system of claim 37, further comprising a controller for controlling the wavelength emitted by the laser system, wherein the controller modifies a condition of the laser system to effect a change in wavelength in response to the wavelength measured by the detector.

39. The laser system of claim 35, wherein the enclosure further includes at least one gas flow port for expelling photo-absorbing species such as water vapor, oxygen and hydrocarbons from the enclosure.

40. A laser system comprising:

a molecular fluorine ($F_2$) gain medium disposed in a resonant cavity;

a power supply for exciting the gain medium to produce an output beam having an ultra violet (UV) radiation output resulting from de-excitations of fluorine molecules in the gain medium at substantially 157 nm, and red radiation output resulting from de-excitations of fluorine atoms in the gain medium;

a detector for measuring at least one optical parameter selected from the group of optical parameters consisting of energy, energy stability, bandwidth, wavelength, beam profile, pulse shape, pulse duration, output power, pulse length and pulse to pulse stability of the UV radiation output of the output beam by detecting a beam portion of the output beam;

a gas replenishment module; and a controller, wherein the detector is signal coupled with the controller and sends signals to the controller indicative of measured values of said at least one parameter for said controller to then send control signals to at least one of the gas replenishment module, the power supply of said laser, a wavelength control component of a bandwidth feedback mechanism and a bandwidth control component of a wavelength feedback mechanism; and a sealed enclosure in which at least a portion of a beam path between the resonant cavity and the detector are disposed, said enclosure having its interior atmosphere prepared to be substantially free of species that photoabsorb around 157 nm, and wherein the enclosure comprises:

an entrance port through which the output beam enters the enclosure;

a detector port through which said beam portion of said output beam exits the enclosure to be incident at said detector;

a visible radiation filter for filtering visible radiation from said beam portion of said output beam before being detected at said detector, whereby said at least one optical parameter of the UV radiation from the de-excitations of fluorine molecules is measured by the detector without substantial interference by the visible radiation from de-excitations of fluorine atoms; and an exit port through which the substantial portion of the output beam exits said enclosure.

41. The laser system of claim 40, wherein said species include water vapor, oxygen and hydrocarbons.

42. The laser system of claim 40, wherein the at least one optical parameter includes one of energy, energy stability, bandwidth, wavelength, beam profile, pulse shape and pulse duration.

43. The laser system of claim 40, wherein the at least one optical parameter includes wavelength.

44. The laser system of claim 43, further comprising a controller for controlling the wavelength emitted by the laser system, wherein the controller modifies a condition of the laser system to effect a change in wavelength in response to the wavelength measured by the detector.

45. The laser system of claim 40, wherein the enclosure further includes at least one gas flow port for expelling photo-absorbing species such as water vapor, oxygen and hydrocarbons from the enclosure.

* * * * *